(12) United States Patent
Uldry et al.

(10) Patent No.: US 11,064,777 B2
(45) Date of Patent: Jul. 20, 2021

(54) DECORATIVE ELEMENT MADE BY A SETTING TECHNIQUE

(71) Applicant: OMEGA SA, Biel/Bienne (CH)

(72) Inventors: Igor-Emmanuel Uldry, Cortaillod (CH); Daniel Baumgartner, Oberwangen b. Bern (CH); Stephane Lauper, Cortaillod (CH); Gregory Kissling, Macolin (CH)

(73) Assignee: OMEGA SA, Biel/Bienne (CH)

( * ) Notice: Subject to any disclaimer, the term of this patent is extended or adjusted under 35 U.S.C. 154(b) by 90 days.

(21) Appl. No.: 16/211,272

(22) Filed: Dec. 6, 2018

(65) Prior Publication Data

US 2019/0191832 A1 Jun. 27, 2019

(30) Foreign Application Priority Data

Dec. 22, 2017 (EP) .................................... 17210482

(51) Int. Cl.
*A44C 17/02* (2006.01)
*A44C 17/04* (2006.01)
*G04B 47/04* (2006.01)
*B23P 5/00* (2006.01)

(52) U.S. Cl.
CPC .............. *A44C 17/02* (2013.01); *A44C 17/04* (2013.01); *G04B 47/042* (2013.01); *B23P 5/00* (2013.01)

(58) Field of Classification Search
CPC ..... A44C 17/02; A44C 17/04; A44C 17/0208; A44C 17/0216; A44C 17/0225; G04B 47/042; B23P 5/00
USPC ...................................................... 63/26, 27
See application file for complete search history.

(56) References Cited

U.S. PATENT DOCUMENTS

| | | | | |
|---|---|---|---|---|
| 1,182,534 | A * | 5/1916 | Driggott ............ | A44C 17/0208 63/29.1 |
| 4,972,685 | A * | 11/1990 | Poll ........................ | A44C 17/02 63/26 |
| 6,067,818 | A * | 5/2000 | Winkler .................. | A44C 17/02 63/26 |
| 9,402,450 | B2 * | 8/2016 | Huynh ...................... | B23P 5/00 |

FOREIGN PATENT DOCUMENTS

| | | |
|---|---|---|
| CN | 104486964 A | 4/2015 |
| FR | 797.091 | 4/1936 |
| FR | 834.040 | 11/1938 |
| JP | H2-98303 A | 4/1990 |

OTHER PUBLICATIONS

European Search Report dated Jun. 1, 2018 in European Application 17210482.0, filed on Dec. 22, 2017 ( with English Translation of Categories of Cited Documents).
Final Decision of Rejection dated Aug. 18, 2020 in corresponding Japanese Patent Application No. 2018-228755 (with English translation)(5 pages).
First Office Action dated Aug. 21, 2020 in corresponding Chinese Patent Application No. 201811563604.1 (with English translation)(14 pages).

* cited by examiner

*Primary Examiner* — Jack W Lavinder
(74) *Attorney, Agent, or Firm* — Oblon, McClelland, Maier & Neustadt, L.L.P.

(57) ABSTRACT

A setting including an open elastic ring carrying elements for setting a decorative element, the setting being arranged to be placed in a radially compressed state inside a hollow provided in a substrate of an article to be decorated.

10 Claims, 4 Drawing Sheets

DECORATIVE ELEMENT MADE BY A SETTING TECHNIQUE

CROSS-REFERENCE TO RELATED APPLICATION

This application claims priority to European Patent Application No. 17210482.0 filed on Dec. 22, 2017, the entire disclosure of which is hereby incorporated herein by reference.

FIELD OF THE INVENTION

The present invention concerns a setting or mounting allowing a decorative element to be set in a decorative assembly.

BACKGROUND OF THE INVENTION

There are known, in the prior art, decorative pieces intended to be placed on a portable object, such as a watch or piece of jewelry, and in which aesthetic elements are set on the parts of said portable object serving as support.

For this purpose, the support is made of a metal alloy and is machined so that housings appear. During this machining, gripping means taking the form of hooks, more commonly called prongs or grains, are made. Generally speaking, these prongs or grains are made integral with the material forming the portable object, i.e. in one piece with the object. When an aesthetic element, such as a gemstone, needs to be set, the latter is placed inside a housing and the prongs are folded down by plastic deformation so as to hold said aesthetic element inside the housing. This setting method is widely used for setting gemstones on metal supports since the metal has an advantageous plastic deformation capacity. Cold plastic deformation of crystalline metals and their alloys is made possible by the movements of the lattice dislocations present in the crystal lattices. The elastic limit, i.e. the stress beyond which a material starts to deform plastically, of a crystalline alloy depends on its constituent elements and on the thermo-mechanical history of the alloy. For the conventional setting method, alloys having relatively low elastic limits are generally selected to facilitate the work of the setter. In addition to a relatively low elastic limit, it is necessary for the alloy to have sufficient elongation at break to be able to fold the prongs over without them breaking. As with the elastic limit, this elongation is the consequence both of the elements present in the alloy and of the thermo-mechanical history of the latter. For example, gold alloys used in horology have an elastic limit on the order of 200-400 MPa and an elongation at break of 20-40%. 1.4435 type stainless steels have an elastic limit of 200-300 MPa and an elongation at break of 25-45%.

Nevertheless, one drawback of this method is that it is limited to supports made of ductile metals or metal alloys. However, timepieces are increasingly made of materials with no plastic deformation, which are often hard and/or brittle, such as for example, ceramics, silicon, sapphire, intermetallic alloys, or metal, natural or polymer matrix composites.

Consequently, it is no longer possible to use the conventional method for setting aesthetic elements, such as for example, gemstones.

This setting operation is therefore generally replaced by an adhesive bonding operation. The drawback of adhesive bonding is that it cannot ensure 100% retention of the stones since, unlike setting, this technique does not entail any mechanical retention of the stones. Indeed, because the bonded areas are in most cases exposed to the external environment (humidity, sweat, UV, air pollution, . . . ) this makes it difficult for the bond to achieve long-term durability. Consequently, the adhesion of the stones is not guaranteed, which is unacceptable for high quality products.

European Patent Application No EP2796297 describes a solution to this problem by using an intermediate material between the non-deformable support and the decorative element. In this document, a cavity is made in the support, said cavity is then filled with a ductile material making it possible to set the decorative element. Filling the cavity requires the use of hot forming processes, such as casting, thermoforming, hot press fit or densification of a metal powder. This type of method thus induces thermal stresses, which are complex to control, and a specific tool.

U.S. Pat. No. 9,402,450 describes a setting including non-deformable claws that fit inside grooves provided in a gemstone, with the base of the setting being inserted into a hole in a support piece. In this document, plastic deformation of the base of the setting or of the support piece makes it possible to secure the setting to the support according to a principle similar to riveting. This plastic deformation is accompanied by a tightening of the claws, improving the stability of the setting. One drawback of this setting is that the stone must be pre-mounted. Further, this device is not suitable for insertion into a brittle material and does not allow settings or mountings to be interlinked, since the rivet holes are necessarily separated in order to properly secure the elements. Finally, it is indispensable to access the setting from the back for permanent assembly inside the support, which makes this setting unsuitable for blind holes, which are however indispensable in the case, for example, of a watch case.

SUMMARY OF THE INVENTION

The present invention concerns a setting or mounting comprising an elastic ring carrying setting elements, said elastic ring including an opening for compressing said ring to press it into a hollow in a support.

Advantageously, the setting elements are plastically deformable to enable a decorative element to be set by plastic deformation of the setting elements.

A second aspect of the invention concerns a decorative assembly comprising a support inside which is arranged at least one hollow and at least one setting, said setting comprising an open elastic ring carrying elements for setting a decorative element, said ring being placed in a prestressed state inside said hollow.

Advantageously, the support is made from a material that does not have sufficient plastic deformation to allow setting of the decorative element.

Preferably, the setting includes holding elements cooperating with corresponding holding elements in the hollow. These holding elements preferably include at least one recess arranged in the lateral wall of the hollow or in the lateral wall of the setting and a protrusion in the complementary wall.

Advantageously, the setting or the hollow includes at least one oblique surface, said oblique surface being arranged such that the setting is compressed when it is pressed into the hollow.

In a preferred embodiment, the decorative assembly of the invention includes at least two hollows and two settings and one of the settings fits into a housing of the preceding setting, this housing being preferably placed in the extension of the opening of the setting.

Advantageously, the setting includes at least or is composed of at least one precious metal selected from the group consisting of gold, platinum, palladium, rhenium, ruthenium, rhodium, silver, iridium, osmium, and their alloys.

Alternatively, the setting may also be composed of a metal alloy in amorphous or at least partially amorphous form.

A third aspect of the invention concerns a decorated article comprising a decorated assembly according to the invention.

DETAILED DESCRIPTION OF THE INVENTION

The present invention concerns a setting 1 for holding a decorative element, such as a gemstone 10, in a substrate 9 that does not have sufficient plastic deformation for a conventional setting technique. This generally concerns hard and brittle materials such as ceramic, silicon, sapphire, intermetallic alloys, or metal, natural or polymer matrix composites.

Figure 1:
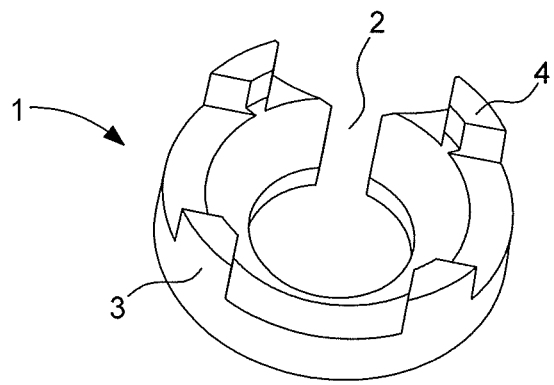
FIG. 1 represents an example of a setting according to the invention.

According to the invention, an intermediate setting 1 is inserted into a hollow 6 made in substrate 9. As represented in FIG. 1, this setting 1 is essentially formed of a ring comprising an opening 2 allowing elastic deformation of setting 1. The elastic compression of the open ring allows setting 1 to be inserted into a hollow 6. Springback after insertion into hollow 6 then secures setting 1 free of play in substrate 9.

The central portion of setting 1 includes a cavity able to accommodate a decorative element such as a gemstone.

The upper portion of setting 1 includes plastically deformable setting elements 4 for setting decorative element 10.

The elastic ring can be compressed, prior to insertion, by means of a suitable tool, such as retaining ring pliers or Seeger ring pliers.

However, when the setting is of small dimensions, as is often the case for gemstones, the setting, and/or hollow 6 preferably includes an inclined surface 5, 15, 16, 19 for compressing setting 1 when setting 1 is pressed into hollow 6.

The walls of the hollow are preferably perpendicular to the surface of support substrate 9, forming a straight cylinder of any cross-section. In that case, setting 1 is held by the friction forces generated by the pressure applied by the prestressed setting on the walls of the hollow.

In an advantageous alternative, hollow 6 has a slight taper, the surface of a cross section of the hollow increasing slightly with depth, to allow efficient mechanical anchoring of a setting 1 with the same taper.

In addition to the friction forces and aforementioned mechanical anchoring, setting 1 and the hollow may include additional anchoring means, such as a groove interlocking with a corresponding protrusion.

The material that forms setting 1 must be both sufficiently ductile to allow the plastic deformation required to set decorative element 10 and simultaneously have sufficient reversible elastic deformation to allow the mechanical anchoring of setting 1 in the hollow.

Advantageously, this material includes gold, platinum, palladium, rhenium, ruthenium, rhodium, silver, iridium, osmium, or an alloy containing at least one of these elements.

Figure 2:
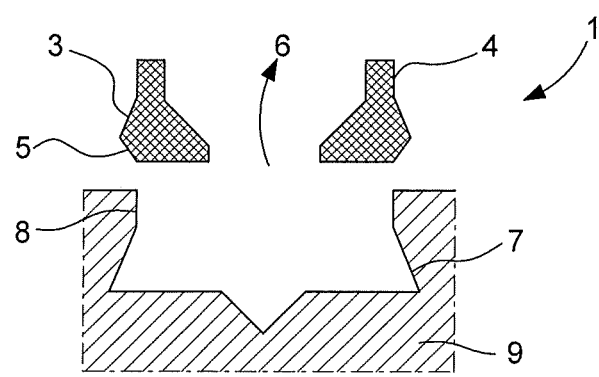
FIGS. 2 to 6 represent schematic cross-sections of the sequence for inserting a setting of the invention into a decorative assembly.

FIG. 2 represents a setting 1 ready for insertion into a hollow 6 of a substrate 9. This setting includes a protruding surface 3, cooperating, when the setting is secured, with an inclined surface 7 forming a recess in the hollow. The lower portion of the setting has a conical surface 5 whose lower diameter is slightly smaller than the diameter of the upper orifice of the hollow.

Figure 3:
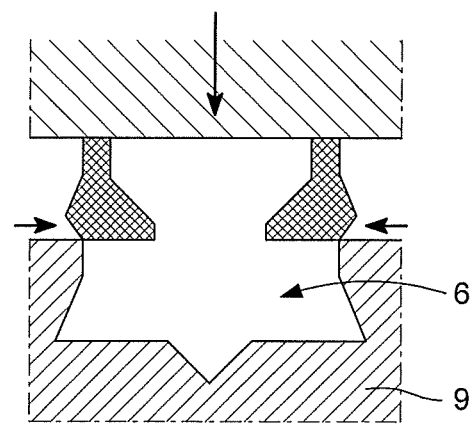

FIG. 3 represents the step of inserting the setting into the hollow. The user pushes the setting into the hollow, which has the effect of pushing conical surface 5 of the lower portion of the setting onto the upper edges of the hollow. This vertical pressure on conical surface 5 has the effect of compressing the setting (elastic ring) which can then enter hollow 6.

Figure 4:
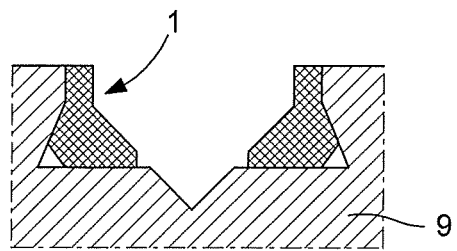

In FIG. 4 the setting has been pushed to the bottom of the hollow. In this position, the diameter of the setting increases again by springback, and lateral protruding surface 5 of the setting occupies the groove formed by inclined surface 7 of hollow 6. This elastic expansion of the setting provides excellent quality mechanical anchoring.

Figure 5:
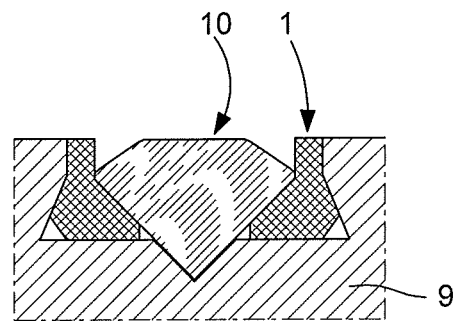
Figure 6:
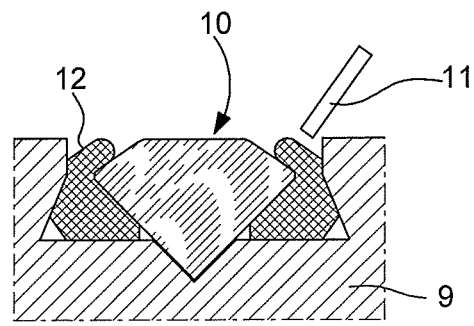

FIG. 5 shows the setting of FIG. 4 in which a decorative element 10 has been placed. This decorative element 10 is then set by plastic deformation of setting elements 12 using a suitable setting tool 11 as represented in FIG. 6.

Figure 7:
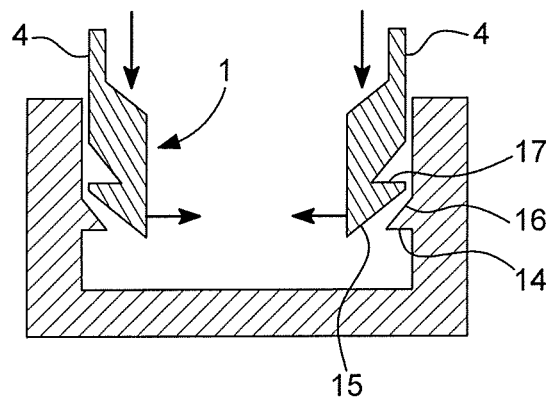
FIGS. 7 and 8 represents cross-sections of other examples of settings/hollows according to the invention.

FIG. 7 represents another example of a setting according to the invention, wherein mechanical anchoring is obtained by the presence of a protrusion 14 on the inner surface of the hollow, cooperating with a groove 17 provided in the setting. In this example, the setting is compressed by means of a conical surface 15 at the base of the setting, assisted, at the moment when the setting is snapped in, by a second conical surface 16 on the upper portion of protrusion 14.

Figure 8:
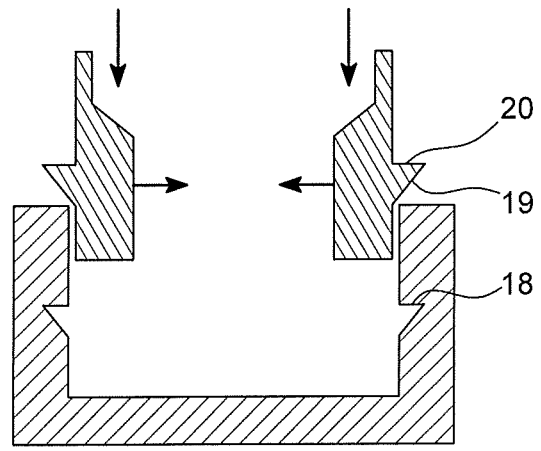

FIG. 8 represents another example of a setting, wherein mechanical anchoring is obtained by a protrusion 20 projecting from the lateral surface of the setting and cooperating with a recess 18 in the lateral wall of the hollow. Again, a conical surface 19 at the bottom of protrusion 20 compresses the setting when the latter is inserted into the hollow.

Be it a protrusion or a groove, the holding means may either be present over the entire contour of the setting and of the hollow, or discontinuous. In this latter case, the holding means can be arranged to ensure suitable angular positioning of the setting.

Figure 9:
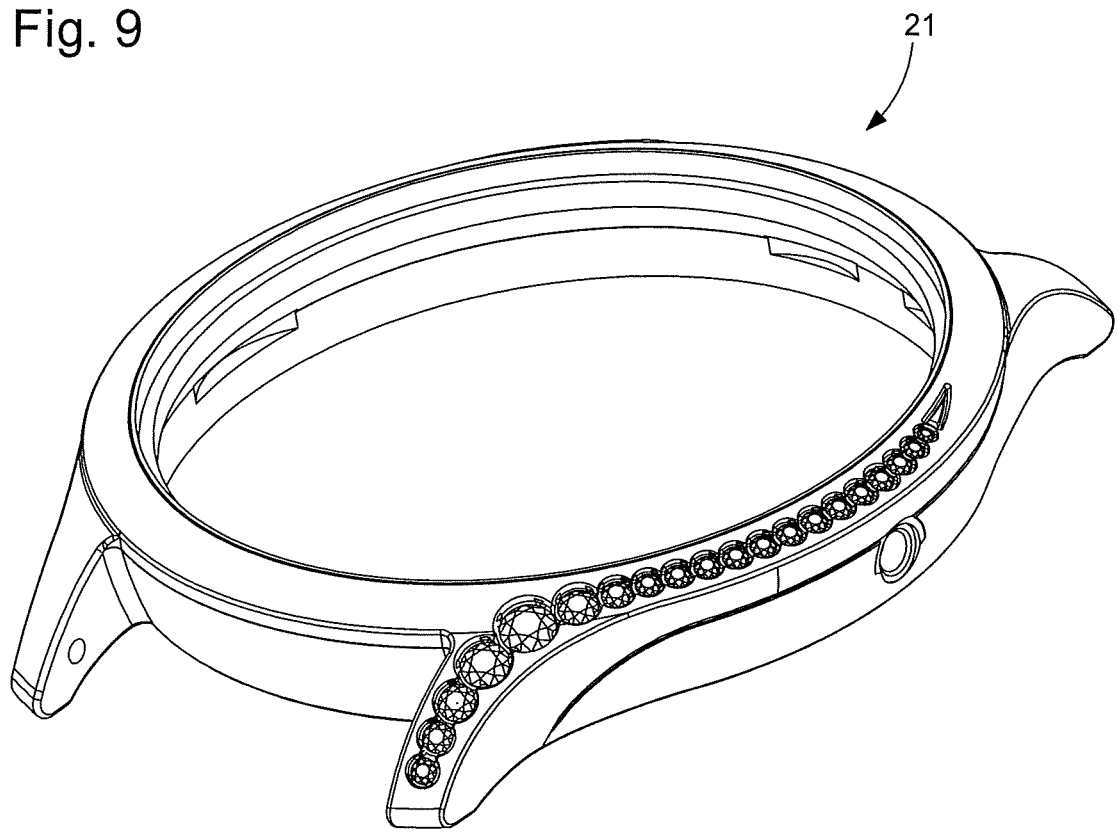
FIG. 9 represents a decorated article comprising a decorative assembly including several settings.
Figure 10:
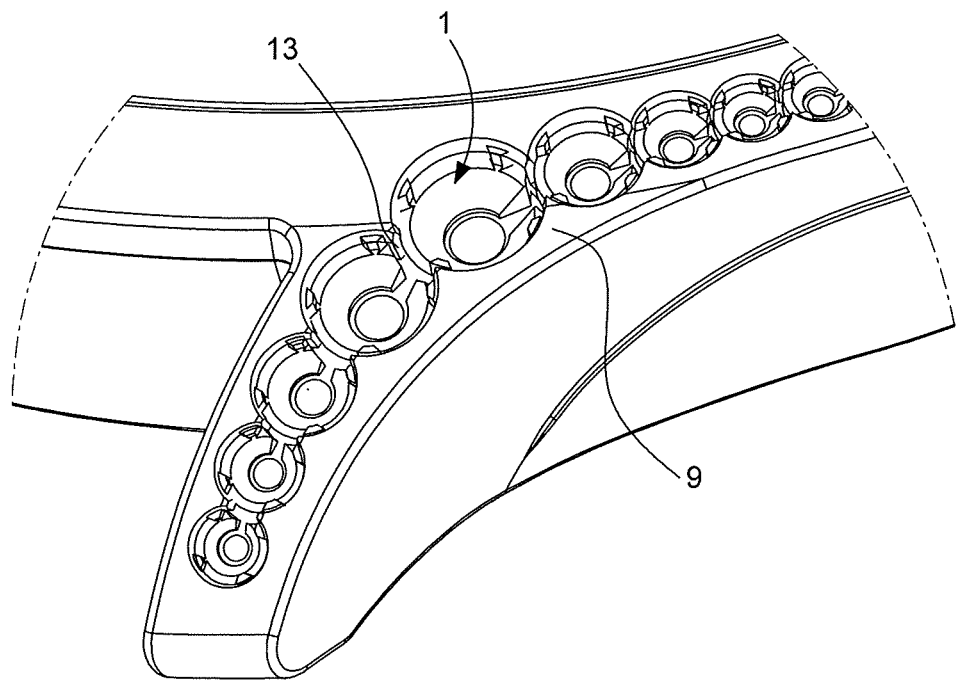
FIG. 10 represents a detail of the decorated article of FIG. 9 before the decorative elements are set.

FIG. 9 shows a decorative part in the form of a watch case comprising a plurality of settings inserted into a plurality of adjacent hollows. It is seen in FIG. 10 that the successive settings fit together at their respective openings (2). These openings, in particular, are adjacent to a recess (13) having exactly the same profile as the next setting. This interlocking arrangement has numerous advantages.

A first advantage is that it forces the setting to have a precise angular positioning, which orients the visible setting prongs 4, 12 in a regular manner. A second advantage is that it locks the settings in an open position, improving the mechanical anchoring thereof in the support.

The substrate hollow can be made by any suitable means, such as machining, milling, laser ablation, or straight in the mould of the support. For example, in the case of a ceramic support, the hollow can be obtained by machining or laser ablation of the raw ceramic, the hollowed support being then fired and densified.

Figure 11:
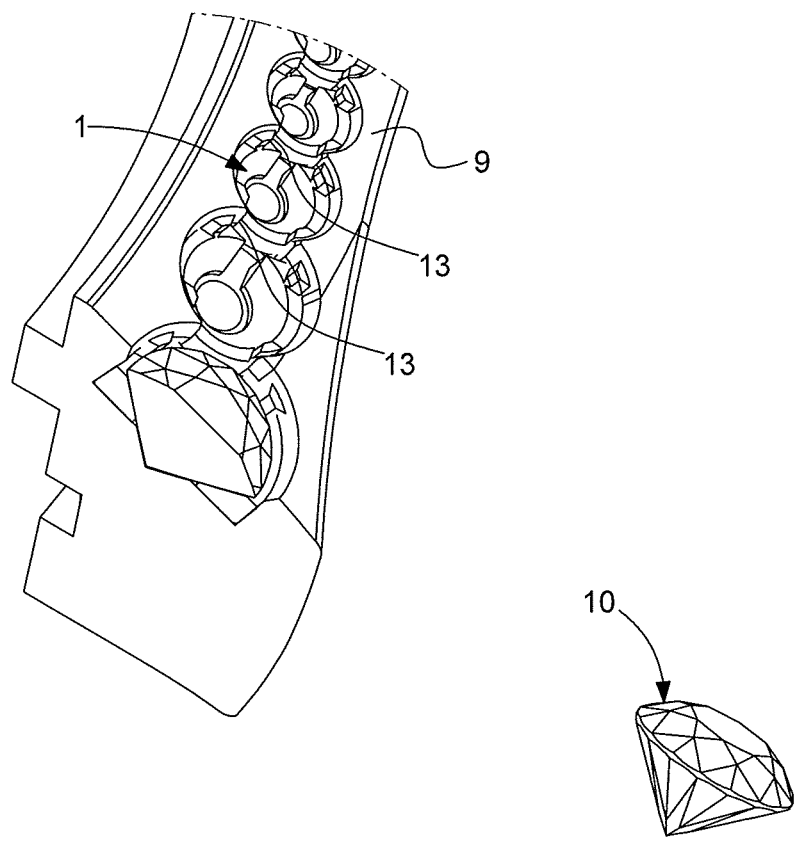
FIG. 11 represents another detail wherein one of the decorative elements is visible in cross section.
Figure 12:
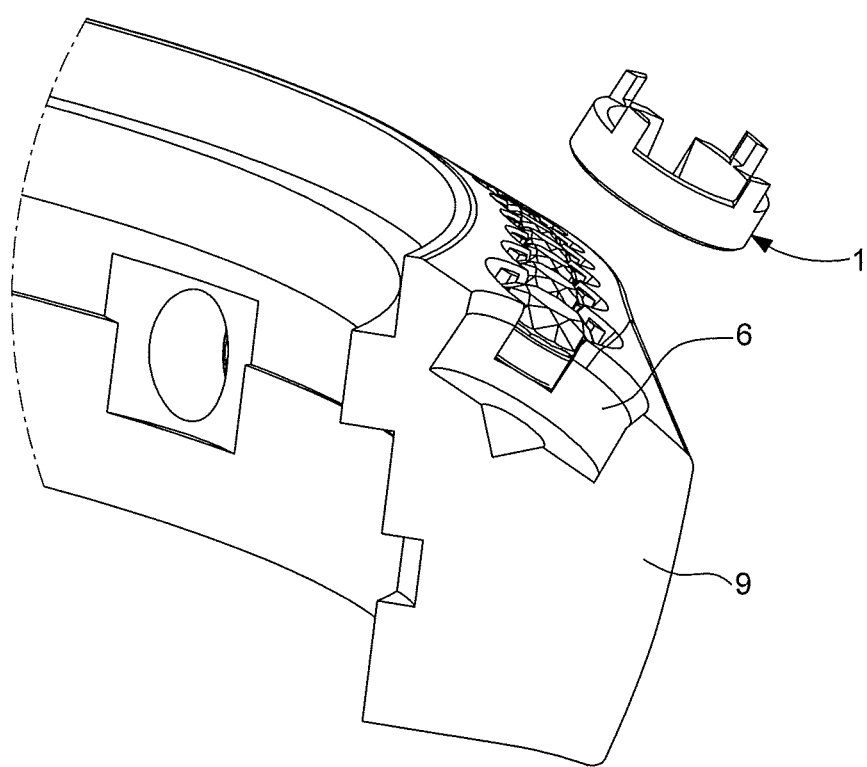
FIG. 12 represents an exploded view of a support, a setting and a decorative assembly.

As seen in FIGS. 11 and 12, the setting of the invention is particularly well suited for securing gemstones in blind holes and does not require access through the back of the support when the decorative element is secured. This feature is particularly advantageous when the decorative element is intended to be inserted into a solid or sealed device such as a watch case.

NUMERICAL REFERENCES OF THE FIGURES

1: setting
2: setting opening
3: holding surface of the setting
4: setting element
5: insertion surface of the setting
6: hollow
7: holding surface inside the support
8: insertion surface of the support
9: support
10: decorative element
11: setting tool
12: closed setting element
13: interlocking area of the settings
14: retaining protrusion in the hollow wall
15, 16: conical compression surface of the setting
17: holding groove arranged in the setting wall
18: holding groove arranged in the hollow wall
19: compression surface of the setting
20: retaining protrusion of the setting
21: decorated article

The invention claimed is:

1. A decorated article comprising:
    a substrate including a hollow;
    a decorative element comprising a setting including an open elastic ring carrying setting elements that set an aesthetic element, said setting being arranged in a radially inward compressed state when said setting is pressed into the hollow and said setting is configure to spring back from said radially inward compressed state when said setting is positioned at a bottom of the hollow; and
    a second hollow in the substrate, the second hollow being adjacent to the hollow, a second setting including a second open elastic ring being positioned in the second hollow, wherein the setting extends into an opening of the open elastic ring of the second setting.

2. The decorated article according to claim 1, wherein the substrate is made from a material that does not have sufficient plastic deformation to allow setting of the decorative element.

3. The decorated article according to claim 2, wherein the material of the setting is ceramic, silicon, sapphire, an intermetallic alloy, or a metal, natural or polymer matrix composite.

4. The decorated article according to claim 1, wherein the setting comprises holding elements cooperating with corresponding holding elements in the hollow.

5. The decorated article according to claim 4, wherein the holding elements comprise at least one recess arranged in a lateral wall of the hollow and a protrusion in a complementary wall of the setting.

6. The decorated article according to claim 4, wherein the holding elements comprise at least one recess arranged in a lateral wall of the setting and a protrusion in a complementary wall of the hollow.

7. The decorated article according to claim 1, wherein the setting or the hollow comprises at least one oblique surface, said oblique surface being arranged such that the setting is compressed when the setting is pressed into the hollow.

8. The decorated article according to claim 1, wherein the setting comprises at least one precious metal selected from the group consisting of gold, platinum, palladium, rhenium, ruthenium, rhodium, silver, iridium, osmium, and their alloys.

9. The decorated article according to claim 1, wherein the hollow is a blind hole.

10. The decorated article according to claim 1, wherein the setting elements are plastically deformed around the decorative element.

* * * * *